United States Patent
Kim (10) Patent No.: US 7,239,289 B2
(45) Date of Patent: Jul. 3, 2007

(54) DEVICE AND METHOD FOR ANTENNA MATCHING IN PORTABLE WIRELESS TERMINAL WITH BUILT-IN ANTENNA

(75) Inventor: Kang-Sik Kim, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 79 days.

(21) Appl. No.: 11/249,064

(22) Filed: Oct. 12, 2005

(65) Prior Publication Data

US 2006/0077107 A1 Apr. 13, 2006

(30) Foreign Application Priority Data

Oct. 12, 2004 (KR) .................... 10-2004-0081196

(51) Int. Cl.
*H01Q 1/50* (2006.01)
(52) U.S. Cl. .................. 343/860; 343/702; 455/575.3
(58) Field of Classification Search ............... 343/860, 343/702; 455/575.3, 80
See application file for complete search history.

(56) References Cited

U.S. PATENT DOCUMENTS 6,765,540 B2 * 7/2004 Toncich ...................... 343/860
6,862,432 B1 * 3/2005 Kim ........................... 455/80
6,985,760 B2 * 1/2006 Hosonuma ............... 455/575.3

FOREIGN PATENT DOCUMENTS

KR    10-2001-0011282    2/2001

* cited by examiner

*Primary Examiner*—Hoang V. Nguyen
(74) *Attorney, Agent, or Firm*—The Farrell Law Firm (57) ABSTRACT

Disclosed is an antenna matching device of a folder type portable wireless terminal with a built-in antenna. In the antenna matching device, a π-type matching circuit is connected between an built-in antenna and a duplexer, one end of a passive element is shunted between the π-type matching circuit and the duplexer, and an active element opens or connects the other end of the passive element to ground according to the opening or closing of a folder of the terminal. The antenna matching device lowers antenna impedance difference between the opened and closed states of the folder, such that the terminal can constantly maintain its radiation performance, such as VSWR and resonant frequency, regardless of the opened or closed position of the folder.

13 Claims, 9 Drawing Sheets

DEVICE AND METHOD FOR ANTENNA MATCHING IN PORTABLE WIRELESS TERMINAL WITH BUILT-IN ANTENNA

PRIORITY

This application claims priority under 35 U.S.C. § 119 to an application entitled "Antenna Matching Device And Method For Portable Wireless Terminal With Built-In Antenna" filed in the Korean Intellectual Property Office on Oct. 12, 2004 and assigned Ser. No. 2004-0081196, the contents of which are incorporated herein by reference.

BACKGROUND OF THE INVENTION

1. Field of the Invention

The present invention relates to a portable wireless terminal with a built-in antenna, and, more particularly, to an antenna matching device and method that allow the terminal to have steady radiation performance regardless of whether a folder of the terminal is opened or closed.

2. Background of the Prior Art

Recently, portable wireless terminals are becoming more popular, and terminals having various functions and designs are being introduced. Further, small-sized, slim and lightweight terminals that are being introduced are, at the same time, required to provide various functions in order to satisfy user's demand. Therefore, the design of the terminal is focused on reducing the terminal size while maintaining or improving the terminal's functions, to ensure the customer satisfaction.

Specifically, terminals having a rod antenna (i.e. whip antenna) and a helical antenna that are protruded outward from the terminal are easily broken when the terminal is dropped, and such antennas reduce the portability of the terminal. Therefore, a plate type antenna installed within the terminal is being widely used. The plate type antenna is also called a built-in antenna, internal antenna, or intenna, and includes for example, a Planar Inverted F Antenna (PIFA), a Folded Monopole Antenna (FMA), and so on.

Though an external antenna is easy to design owing to its sufficient gain, the built-in antenna is not easy to design because its gain will vary depending on the shape of the terminal. Specifically, the impedance of a built-in antenna will vary according to opening or closing (or sliding up or sliding down) of the folder, causing degradation in efficiency. That is, the radiation performance of the built-in antenna significantly changes according to the opening or closing of the folder. Such change in radiation performance occurs because an antenna impedance matching is designed based on the opened position of folder (or, for sliding type terminals, whether the slider is slid up).

Figure 1:
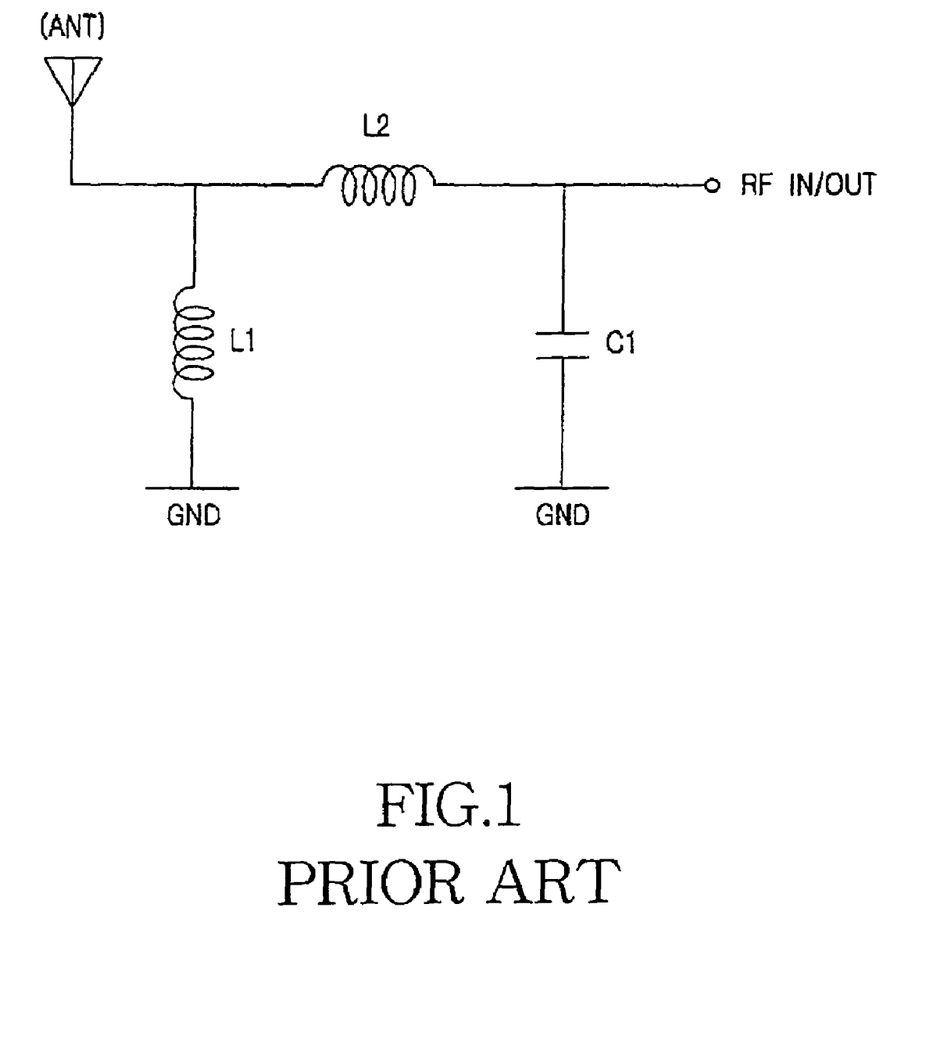
FIG. 1 is a circuit diagram of a conventional π-type antenna matching device.

FIG. 1 is a circuit diagram of a conventional π-type antenna matching device.

Referring to FIG. 1, a π-type matching circuit consists of passive elements of inductors L1 and L2 and capacitor C1. The π-type matching circuit is used for antenna impedance matching. A detailed description of the π-type matching circuit will be omitted because the circuit is well known to those skilled in the art. Specifically, the design of the π-type matching circuit is merely based on the opened position of the folder (or slid up position).

Figure 2A:
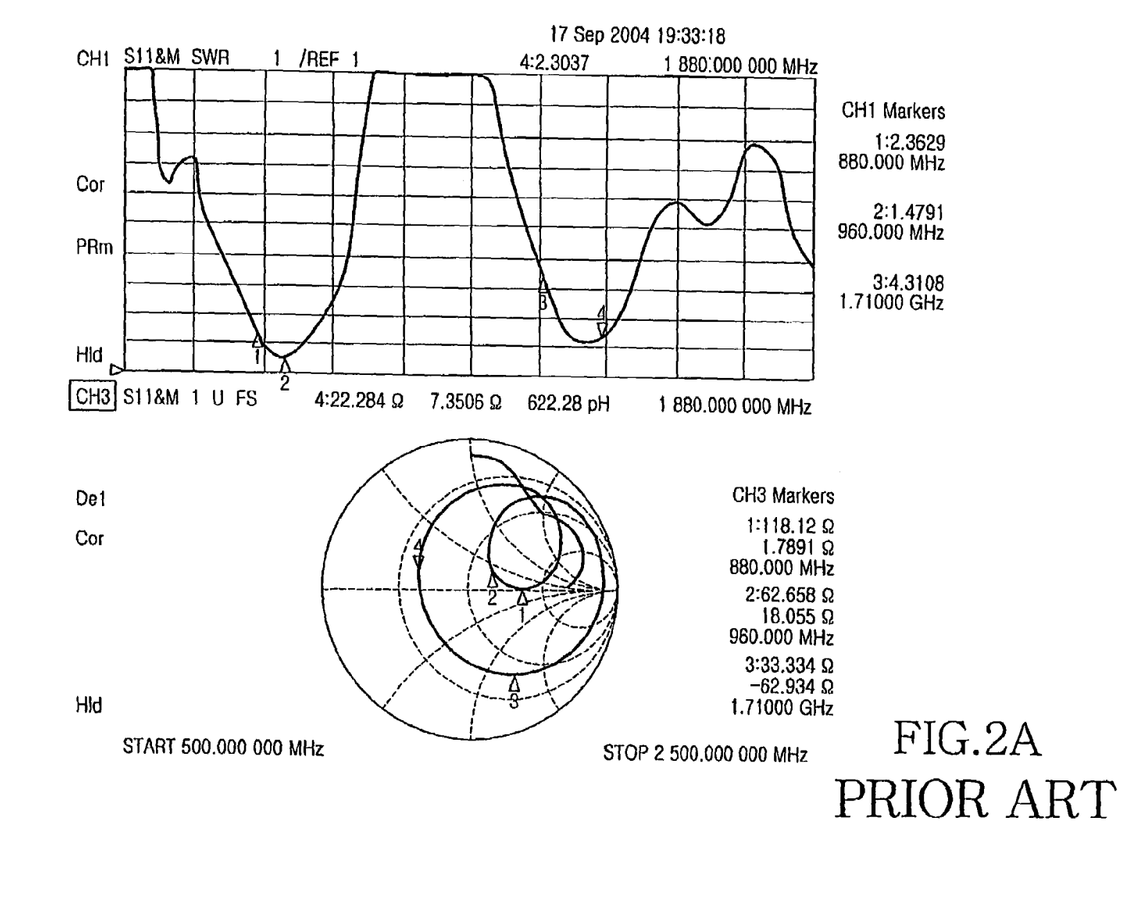
FIGS. 2A and 2B are graphs showing VSWRs according to the opening or closing of a folder when using the device depicted in FIG. 1.
Figure 2B:
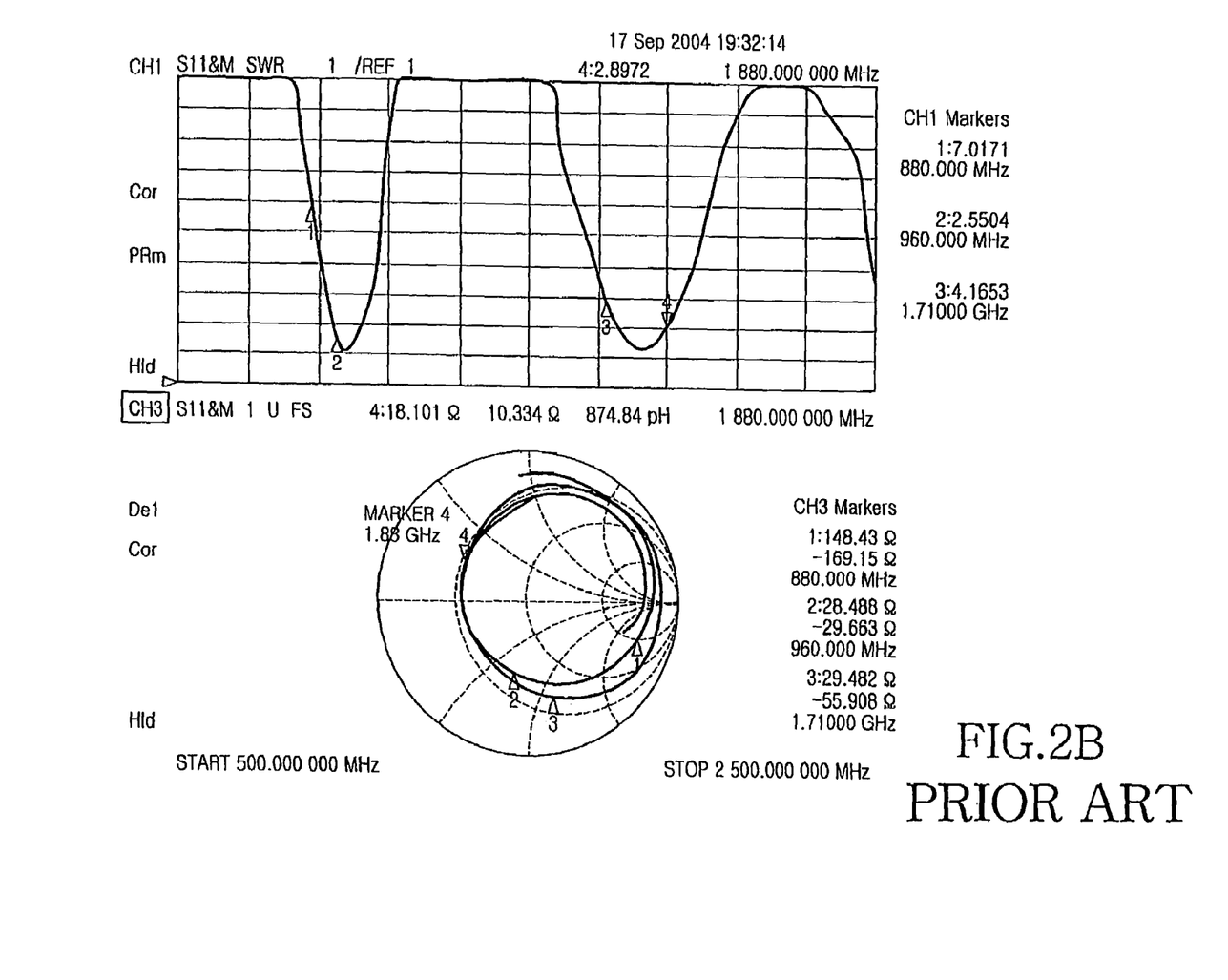

FIG. 2A is a graph showing VSWR of the device depicted in FIG. 1 when a folder is opened, and FIG. 2B is a graph showing VSWR of the device depicted in FIG. 1 when a folder is closed. The vertical axis of each graph denotes VSWR and the horizontal axis of each graph denotes frequency.

The π-type matching circuit of FIG. 1 has an L1 value of 5.6 nH, an L2 of value 1.0 nH, and a C1 value of 1.5 pF. Triangular markers 1 and 2 are used to denote VSWRs measured from a Global System for Mobile (GSM) terminal having upper and lower frequency limits of 880 MHz and 960 MHz. Triangular markers 3 and 4 are used to denote VSWRs measured from a Digital Cordless System (DCS) terminal having upper and lower frequency limits of 1710 MHz and 1880 MHz.

In the case of the GSM terminal, when the folder is opened (refer to FIG. 2A), the graph reads a VSWR of 2.3629 in a transmission line and a VSWR of 1.4791 in a receiving line. In the case of the GSM terminal, when the folder is closed (refer to FIG. 2B), the graph reads a VSWR of 7.0171 in the transmission line and a VSWR of 2.5504 in the receiving line, and a resonant frequency is out of the frequency range between 880 MHz and 960 MHz. Since the antenna impedance matching circuit is designed based on the opened position of a folder, the graph reads the higher VSWR, and resonant frequency range is out of frequency range when the folder is closed. Specifically, when the resonant frequency is out of the frequency range, the transmission and reception efficiency of the terminal is lower and an undesired mute state of the terminal exists in weak electric fields.

Accordingly, in conventional systems the antenna matching is carried out by one π-type matching circuit. Since the π-type matching circuit does not cover both the opened (slid-up) and closed (slid-down) positions of the folder (slider), the radiation characteristic of the antenna is biased to one position (e.g. the opened position of the folder). That is, the antenna radiation characteristic can not be optimized for both positions of the folder. Therefore, there is a demand for an antenna matching technology that enables the antenna to have steady radiation performance regardless of whether the folder is opened or closed.

SUMMARY OF THE INVENTION

The present invention provides a device and method for antenna matching in a portable wireless terminal with a built-in antenna, in which a radiation performance is constantly maintained regardless of opening or closing of the folder.

Also, the present invention provides a device and method for an antenna matching in portable wireless terminal with a built-in antenna, in which a resonant frequency is maintained constantly regardless of opening or closing of the slider.

Further, the present invention provides a device and method for antenna matching in a portable wireless terminal with a built-in antenna, in which a VSWR is constantly maintained regardless of opening or closing of the folder.

According to an aspect of the present invention, an antenna matching device of a folder type portable wireless terminal with a built-in antenna, includes a π-type matching circuit connected between a built-in antenna and a duplexer; an active matching circuit connected between the π-type matching circuit and the duplexer; and a controller for opening or activating the active matching circuit according to opening or closing of a folder of the terminal.

According to another aspect of the present invention, an antenna matching device of a folder type portable wireless terminal with a built-in antenna, includes a π-type matching circuit connected between an antenna and a duplexer; a passive element of which one end is shunted between the π-type matching circuit and the duplexer; and an active element for opening or connecting the other end of the passive element to ground according to opening or closing of a folder of the terminal.

According to a further another aspect of the present invention, an antenna matching method for a portable wireless terminal having a built-in antenna, and a π-type matching circuit and an active matching circuit that are connected between the built-in antenna and an duplexer of the terminal, the method includes detecting whether a folder of the terminal is opened or closed; operating the π-type matching circuit alone when the folder is detected to be opened; and operating both the π-type matching circuit and the active matching circuit when the folder is detected to be closed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Also, when it is determined that an aspect of the invention is well known to those of skill in the art, a detailed description of that aspect is omitted from conciseness.

The present invention is directed to an antenna matching device in a portable wireless terminal that allows the terminal to have steady radiation performance regardless of opened or closed state of the terminal. Though the present invention will now be described when it is applied to a folder type portable wireless terminal, the present invention can be applied to various types of wireless terminals having a built-in antenna, such as a sliding type wireless terminal. Therefore, the opening or -closing of the terminal may be opening or closing of a folder in the folder type terminal, or sliding-up or sliding-down of a sub-body in the slide type terminal.

Figure 3:
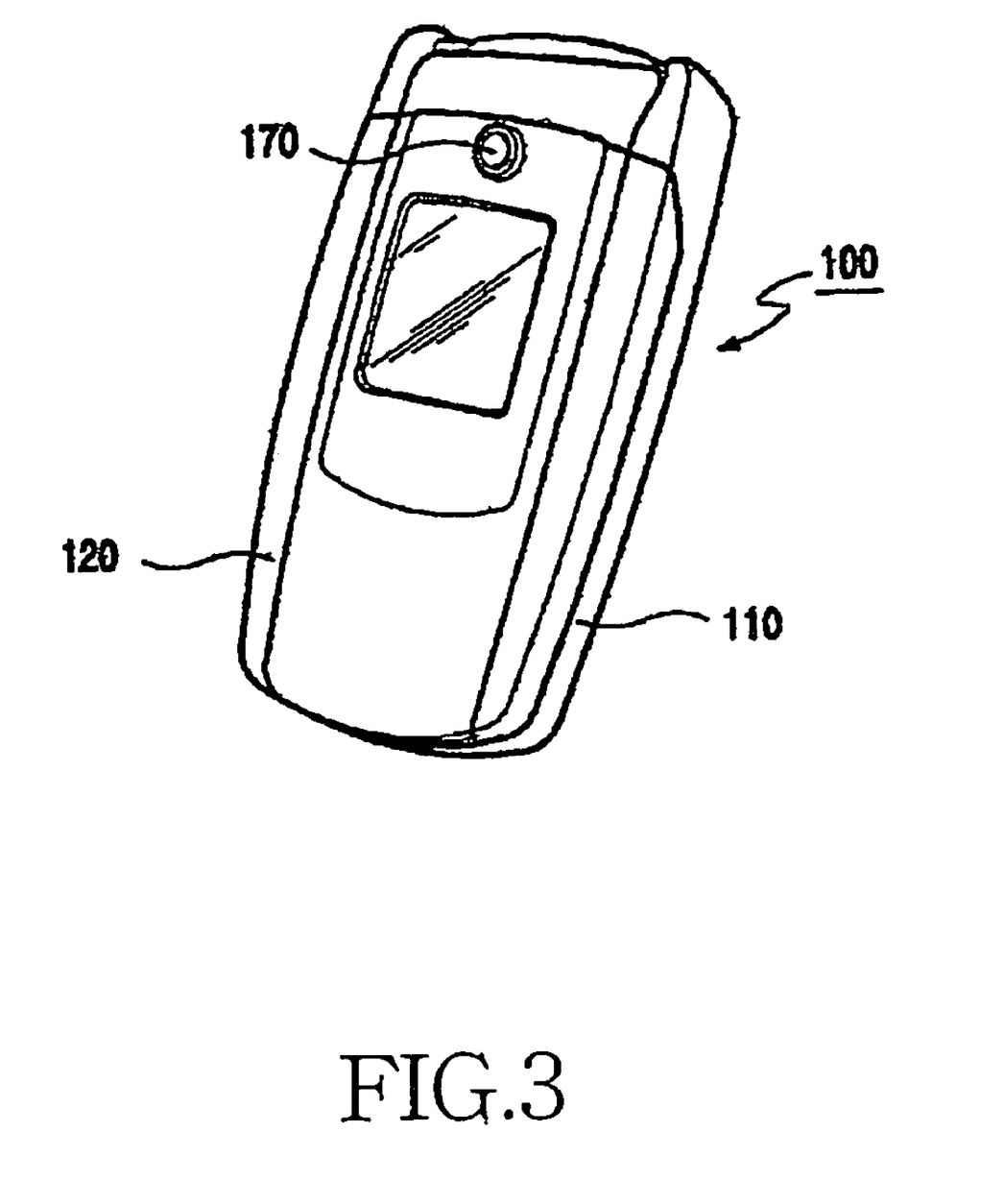
FIG. 3 is a perspective diagram of a typical folder type portable wireless terminal with a built-in antenna, to which the present invention can be applied.
Figure 4:
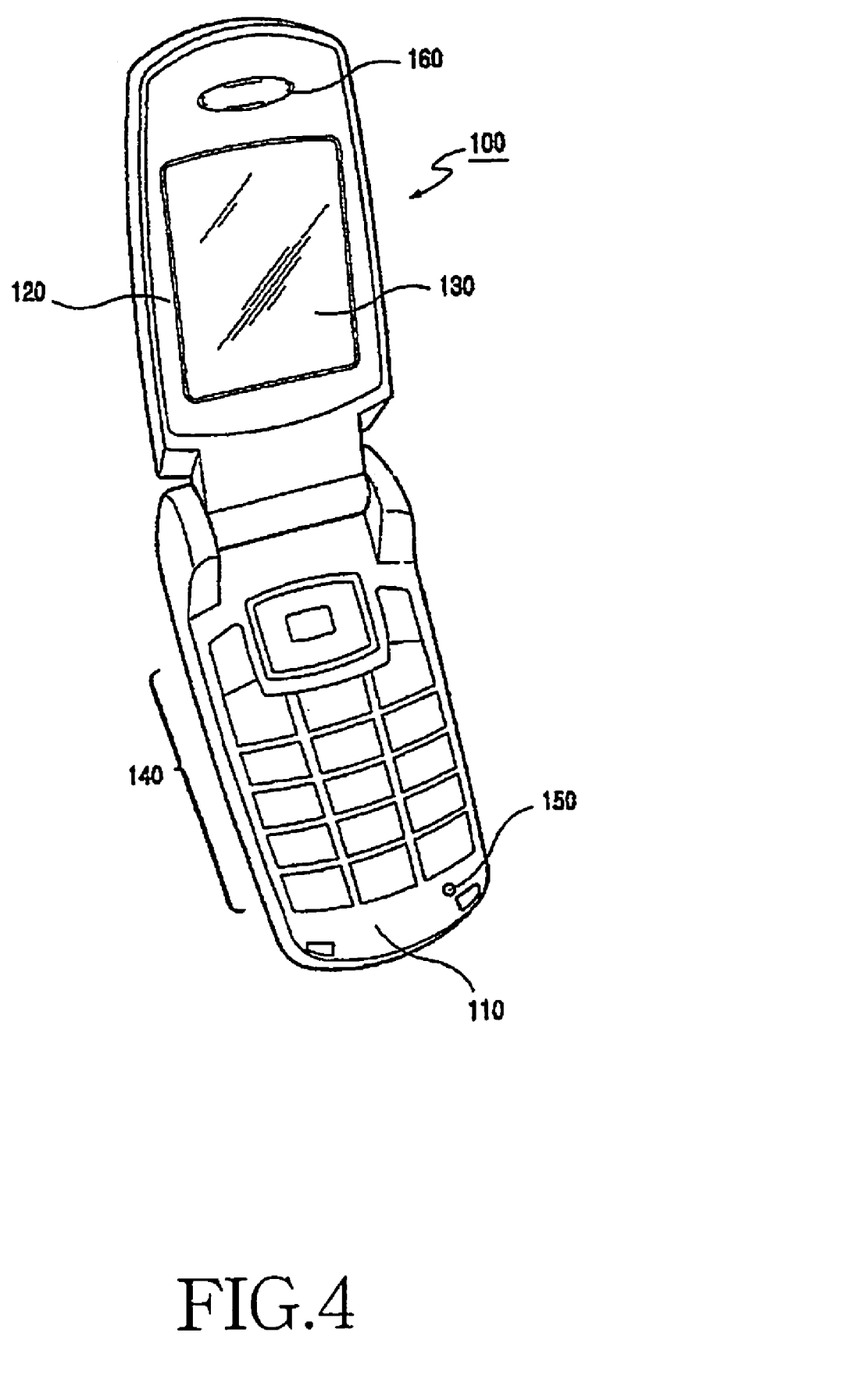
FIG. 4 is a perspective diagram of the terminal depicted in FIG. 3 when a folder of the terminal is opened.

FIG. 3 is a perspective diagram of a typical folder type portable wireless terminal with a built-in antenna, to which the present invention is applied, and FIG. 4 is a perspective diagram of the terminal depicted in FIG. 3 when a folder of the terminal is opened.

Referring to FIGS. 3 to 4, a folder type portable wireless terminal 100 includes a main body 110, a folder 120 connected to the main body 110 and rotatable thereto, and a hinge module enabling the rotation of the folder 120 at an angle ranging from about 130° to about 140°.

The main body 110 includes a keypad assembly 140 having navigation buttons as a data input device and a microphone 150 under the keypad assembly 140 to receive a user's voice. The folder 120 includes a display 130 (preferably a wide color LCD module) as a data output device and an earpiece 160 from which the user can hear voice. Also, the terminal 100 may include an external display at an outer surface of the folder and a camera 170 above the external display for taking pictures, as shown in FIG. 3. Since the terminal 100 uses a built-in antenna installed therein, a protruded antenna is not present.

Figure 5:
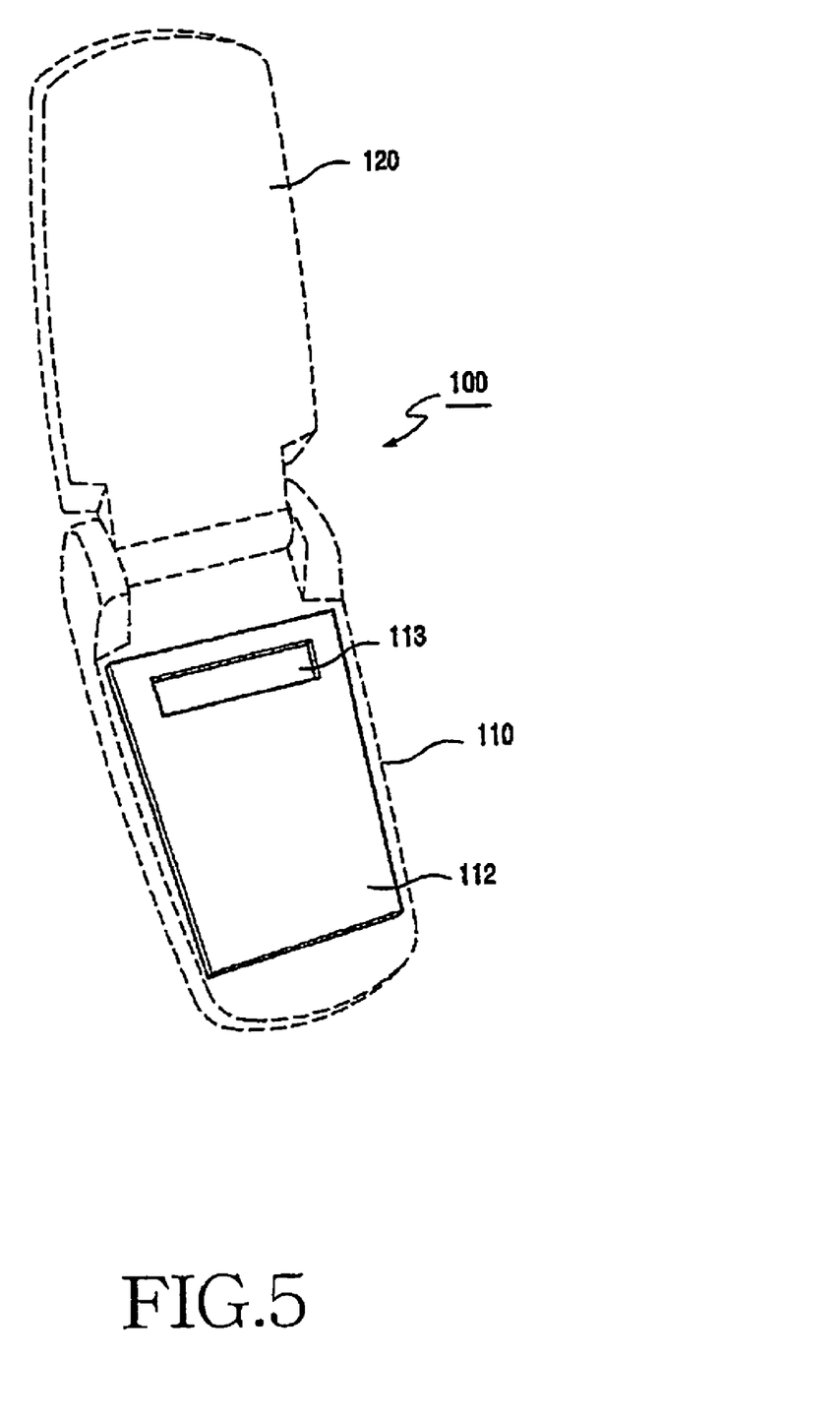
FIG. 5 is a schematic perspective diagram showing a built-in antenna in the terminal depicted in FIG. 4.

FIG. 5 is a schematic perspective diagram showing a built-in antenna in the terminal depicted in FIG. 4.

Referring to FIGS. 3–5, the terminal 100 includes an RF board 112 installed in the main body 110 and a built-in antenna 113 installed at an upper portion of the RF board 112. The built-in antenna 113 may be a plate type antenna having one of various shapes. That is, the built-in antenna 113 may be of a various types and have a shape according to the type, shape, and application frequency of the terminal 100.

Figure 6:
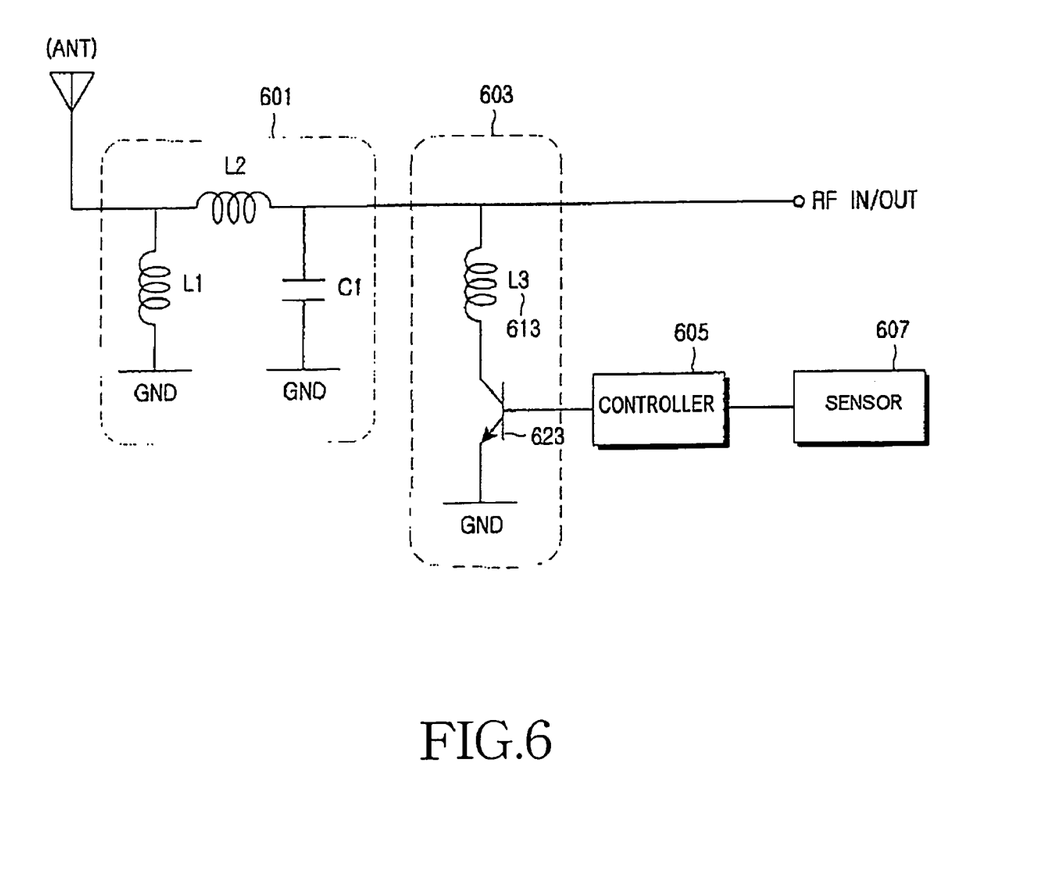
FIG. 6 is a circuit diagram of an antenna matching device for improving radiation performance in a folder type portable wireless terminal with a built-in antenna according to an embodiment of the present invention.

FIG. 6 is a circuit diagram of an antenna matching device for improving radiation performance in a folder type portable wireless terminal with a built-in antenna according to an embodiment of the present invention.

Referring to FIG. 6, an antenna matching device includes a π-type matching circuit 601, an active matching circuit 603, a controller 605, and a sensor 607 for detecting the opened or closed position of the folder 120. The active matching circuit 603 includes a passive element 613 and an active element 623, for example, an inductor L3 (passive element) and a transistor (active element), respectively.

The π-type matching circuit 601 is connected between an antenna and an RF input/output end (or a duplexer), and the active matching circuit 603 is connected between the π-type matching circuit 601 and the RF input/output end. In the active matching circuit 603, one end of the inductor L3 613 is shunted between the π-type matching circuit 601 and the RF input/output end, the other end of the inductor L3 613 is connected to a collector of the transistor 623, a base of the transistor 623 is connected to a General Purpose Input/Output (GPIO) end of the controller 605, and an emitter of the transistor 623 is connected to ground GND.

The sensor 607 detects the opening or closing of the folder 120 and sends a corresponding signal to the controller 605. The controller 605 sends a control signal to the base of the transistor 623 according to the signal from the sensor 607. For example, the controller 605 sends a "Low" signal to the transistor 623 when the folder 120 is opened, and sends a "High" signal to the transistor 623 when the folder is closed.

The transistor 623 is turned on or off in response to the control signal from the controller 605, such that the other end of the inductor L3 613 can be connected to the ground GND or be opened. That is, opening the folder 120 turns off the transistor 623 and therefore opens the other end of the inductor L3 613, so that the π-type matching circuit 601 operates alone, i.e. without the operation of the active matching circuit 603. Since the π-type matching circuit 601 is designed based on the opened state of the folder 120, the terminal 100 can be operated with the optimized antenna radiation performance when the folder 120 is opened.

When the folder 120 is closed, the transistor 623 is turned on and therefore the other end of the inductor L3 613 is connected to the ground GND, such that both the π-type matching circuit 601 and the inductor L3 613 operate. Since the impedance matching circuit includes both the π-type matching circuit 601 and the active matching circuit 603 in the design of the closed state of the folder 120, the terminal 100 can also operate with an optimized antenna radiation performance even when the folder 120 is closed.

Figure 7A:
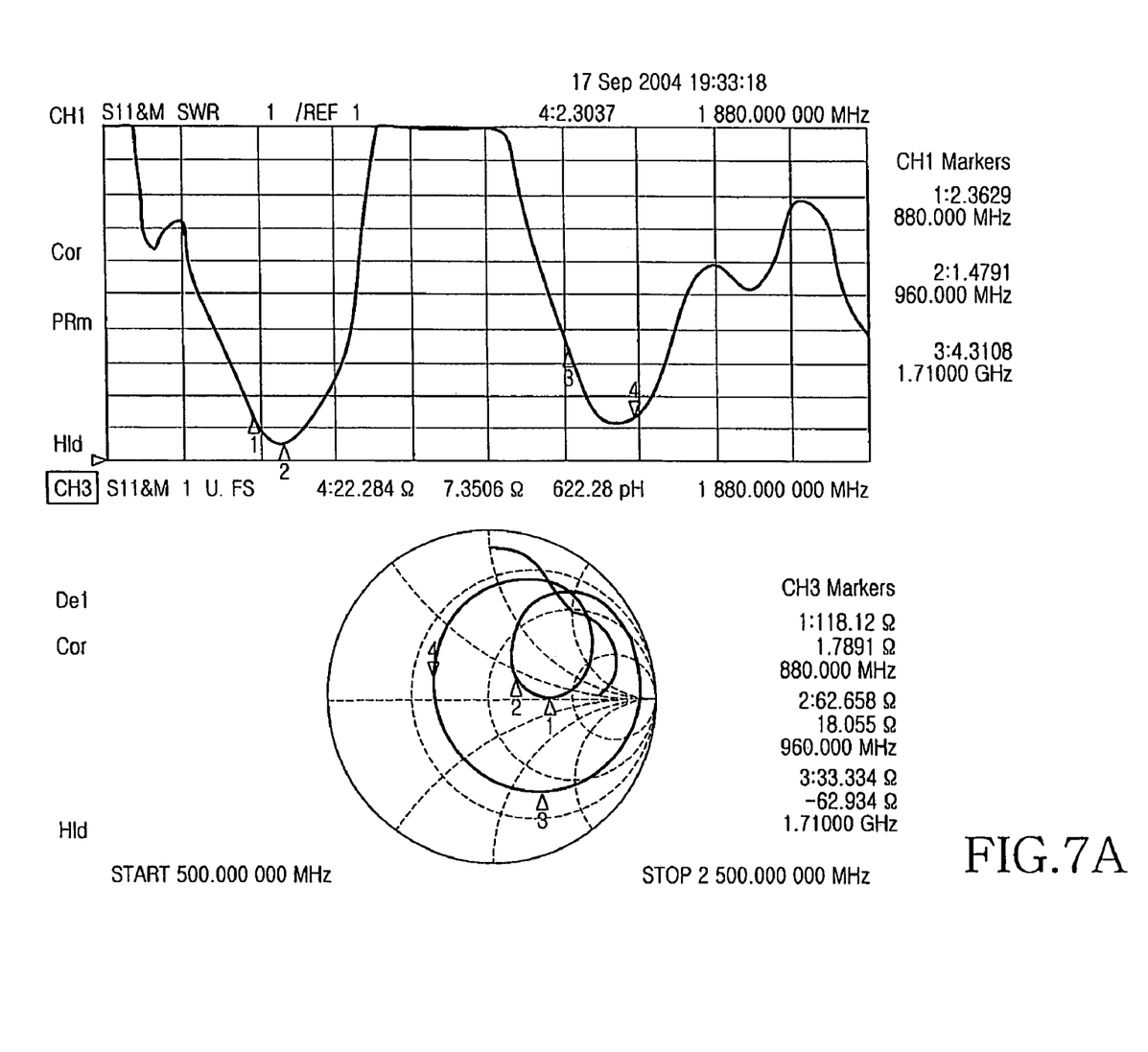
FIGS. 7A and 7B are graphs showing VSWRs according to the opening or closing of a folder when using the antenna matching device depicted in FIG. 6.

FIG. 7A is a graph showing VSWR according to the opening of a folder when using the device depicted in FIG.

Figure 7B:
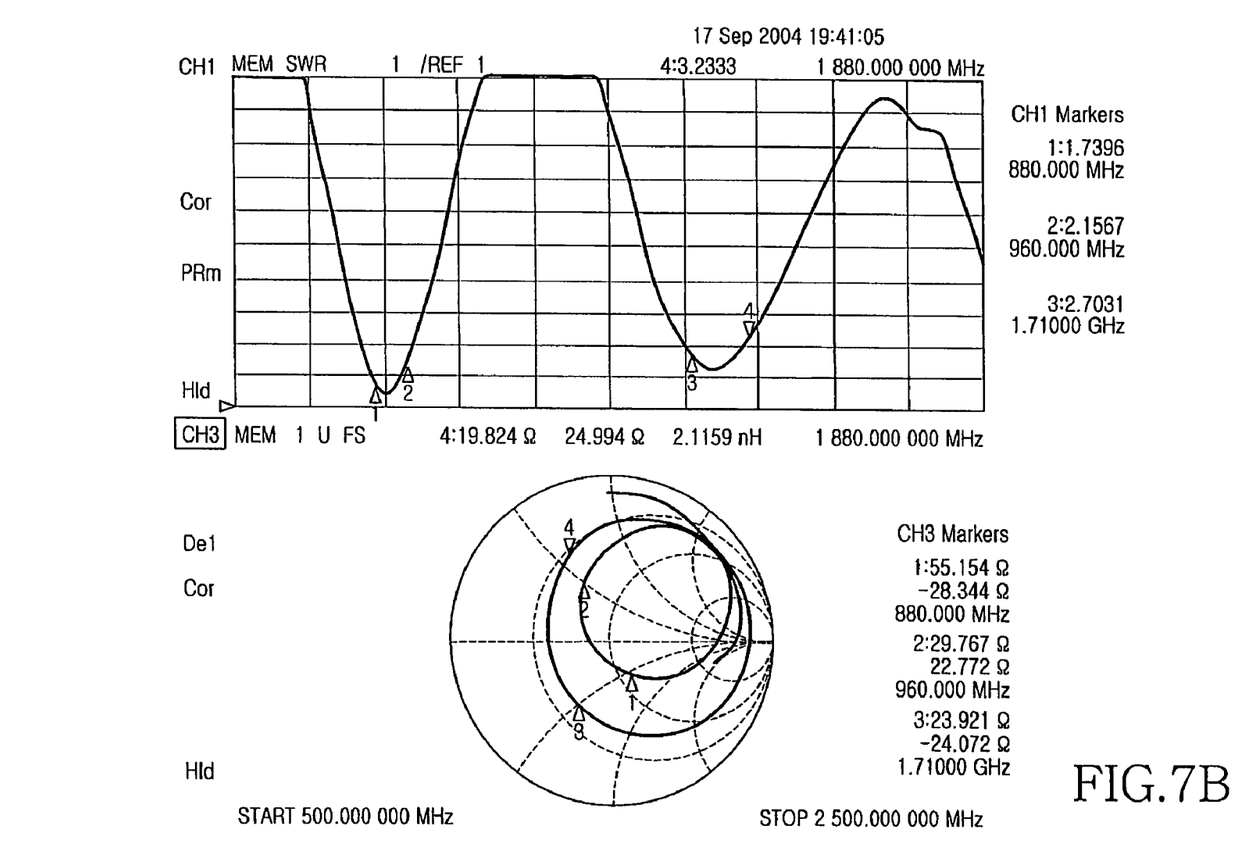

6, and FIG. 7B is a graph showing VSWR according to the closing of a folder when using the device depicted in FIG. 6. The vertical axis of each graph denotes VSWR and the horizontal axis of each graph denotes frequency.

The π-type matching circuit 601 of antenna matching device of FIG. 6 is set with an L1 value of 5.6 nH, an L2 value of 1.0 nH, a C1 value of 1.5 pF, and the active matching circuit 603 of the antenna matching device of FIG. 6 has an L3 value of 4.7 nH. Triangular markers 1 and 2 are used to denote VSWRs measured from a Global System for Mobile (GSM) terminal having upper and lower frequency limits of 880 MHz and 960 MHz. Triangular markers 3 and 4 are used to denote VSWRs measured from a Digital Cordless System (DCS) terminal having upper and lower frequency limits of 1710 MHz and 1880 MHz. When the folder 120 is opened, the antenna matching device of the present invention uses only the π-type matching circuit 601 to carry out the antenna matching, similar to antenna matching devices, such that the graph in FIG. 7A shows the same result when compared with the graph of the prior art antenna matching device (refer to FIG. 2A).

In the GSM terminal when the folder is opened (refer to FIG. 7A), the graph reads a VSWR of 2.3629 in a transmission line and a VSWR of 1.4791 in a receiving line. In the GSM terminal when the folder is closed (refer to FIG. 7B), the graph reads a VSWR of 1.73961 in the transmission line and a VSWR of 2.1567 in the receiving line. That is, the VSWR is maintained almost at the same level regardless of whether the folder 120 is opened or closed. Compared with conventional systems, the present invention significantly improves the VSWR, and the resonant frequency appears within the frequency range of 880 MHz and 960 MHz when the folder 120 is closed (refer to FIGS. 2B and 7B), such that the radiation performance of the terminal 100 can be remarkably improved.

As described above, the antenna impedance difference between the opened and closed states of the terminal can be reduced. That is, the radiation performance such as the VSWR and resonant frequency position can be constantly maintained regardless of the opened or closed position of the folder.

It will be recognized that the forgoing embodiments are merely exemplary and are not to be construed as limiting the present invention. For example, the illustrated passive element of the antenna matching circuit can be replaced by a distributed element such as a microstrip, the present teachings can be readily applied to other types of apparatuses. The description of the present invention is intended to be illustrative, and not to limit the scope of the claims. Many alternatives, modifications, and variations will be apparent to those skilled in the art.

What is claimed is:

1. An antenna matching device of a folder type portable wireless terminal with a built-in antenna, the antenna matching device comprising:
   a π-type matching circuit connected between a built-in antenna and a duplexer;
   an active matching circuit connected between the π-type matching circuit and the duplexer; and
   a controller for activating or opening the active matching circuit according to the closing or opening of a folder of the terminal.

2. The antenna matching device of claim 1, further comprising a sensor for detecting the closing or opening of the folder and sending a corresponding signal to the controller.

3. The antenna matching device of claim 1, wherein the active matching circuit comprises:
   a passive element having one end connected to the π-type matching circuit and the duplexer; and
   an active element for selectively connecting an other end of the passive element to ground under the control of the controller.

4. The antenna matching device of claim 3, wherein the passive element is selected from the group consisting of an inductor, a capacitor and a distributed element including a microstrip.

5. The antenna matching device of claim 3, wherein the active element is a transistor.

6. The antenna matching device of claim 1, wherein the active matching circuit comprises:
   an inductor having one end connected to the π-type matching circuit and the duplexer; and
   a transistor for connecting an other end of the inductor to ground under the control of the controller.

7. An antenna matching device of a sliding type portable wireless terminal with a built-in antenna, the antenna matching device comprising:
   a π-type matching circuit connected between an built-in antenna and a duplexer;
   a passive element having one end connected to the π-type matching circuit and the duplexer; and
   an active element for connecting an other end of the passive element to ground according to an opening or closing of the terminal.

8. The antenna matching device of claim 7, wherein the passive element is selected from the group consisting of an inductor, a capacitor and a distributed element including a microstrip.

9. The antenna matching device of claim 7, wherein the active element is a transistor.

10. An antenna matching method for a portable wireless terminal having a built-in antenna, and a π-type matching circuit and an active matching circuit connected between the built-in antenna and a duplexer, the method comprising:
    detecting whether a folder of the terminal is opened or closed;
    operating the π-type matching circuit alone when the folder is detected to be opened; and
    operating both the π-type matching circuit and the active matching when the folder is detected to be closed.

11. The antenna matching method of claim 10, wherein the active matching circuit comprises:
    a passive element having one end connected to the π-type matching circuit and the duplexer; and
    an active element for selectively connecting an other end of the passive element to ground.

12. The antenna matching method of claim 11, wherein the passive element is selected from the group consisting of an inductor, a capacitor and a distributed element including a microstrip.

13. The antenna matching method of claim 11, wherein the active element is a transistor.

* * * * *